(12) United States Patent
White et al.

(10) Patent No.: US 7,697,505 B2
(45) Date of Patent: Apr. 13, 2010

(54) TECHNIQUES FOR DECREASING QUERIES TO DISCOVER ROUTES IN AN INTERIOR GATEWAY PROTOCOL

(75) Inventors: Russell White, Holly Springs, NC (US); Alvaro Retana, Raleigh, NC (US); Donnie Savage, Raleigh, NC (US)

(73) Assignee: Cisco Technology, Inc., San Jose ( * ) Notice: Subject to any disclaimer, the term of this patent is extended or adjusted under 35 U.S.C. 154(b) by 726 days.

(21) Appl. No.: 11/346,781

(22) Filed: Feb. 3, 2006

(65) Prior Publication Data

US 2007/0183334 A1    Aug. 9, 2007

(51) Int. Cl.
*H04L 12/28* (2006.01)
(52) U.S. Cl. .................. 370/351; 370/217; 370/238
(58) Field of Classification Search ............... 370/238, 370/351, 217, 218
See application file for complete search history.

(56) References Cited

U.S. PATENT DOCUMENTS

| | | | | |
|---|---|---|---|---|
| 5,881,243 A * | 3/1999 | Zaumen et al. | ............ | 709/241 |
| 6,092,096 A | 7/2000 | Lewis | | |
| 6,304,556 B1 | 10/2001 | Haas | | |
| 6,456,599 B1 * | 9/2002 | Elliott | ............ | 370/254 |
| 6,980,524 B1 | 12/2005 | Lu et al. | | |
| 7,035,227 B2 * | 4/2006 | Garcia-Luna-Aceves et al. | ............ | 370/254 |
| 2002/0067720 A1 * | 6/2002 | Garcia-Luna-Aceves et al. | ............ | 370/389 |
| 2002/0101869 A1 * | 8/2002 | Garcia-Luna-Aceves et al. | ............ | 370/389 |
| 2002/0141346 A1 * | 10/2002 | Garcia-Luna-Aceves et al. | ............ | 370/238 |
| 2003/0107992 A1 * | 6/2003 | Garcia-Luna-Aceves et al. | ............ | 370/230 |
| 2005/0249215 A1 | 11/2005 | Kelsey et al. | | |
| 2006/0002291 A1 * | 1/2006 | Alicherry et al. | ............ | 370/225 |
| 2006/0029033 A1 * | 2/2006 | Lee | ............ | 370/351 |
| 2006/0133282 A1 * | 6/2006 | Ramasamy | ............ | 370/238 |
| 2007/0064612 A1 * | 3/2007 | Armanino et al. | ............ | 370/238 |
| 2007/0177527 A1 * | 8/2007 | Bragg et al. | ............ | 370/256 |

* cited by examiner

*Primary Examiner*—Pankaj Kumar
*Assistant Examiner*—Lonnie Sweet
(74) *Attorney, Agent, or Firm*—Patent Capital Group

(57) ABSTRACT

Techniques for recovering lost routes include receiving reported costs for transmitting data to a destination from neighboring nodes; and determining total costs as a sum of costs for transmitting data packets to the neighboring nodes and a corresponding reported cost. A selected neighboring node with a minimum total cost is determined as the next hop for the route to the destination. A feasible successor set of neighboring nodes which have reported costs less than the total cost of the selected neighboring node and excluding the selected neighboring node, and successor data about the feasible successor set, are determined. The successor data is sent to the neighboring nodes. A neighboring node that loses a route to the particular destination node is able to determine whether to query the sending node while recovering a lost route to the destination based on the successor data, thereby reducing network resource consumption.

14 Claims, 6 Drawing Sheets

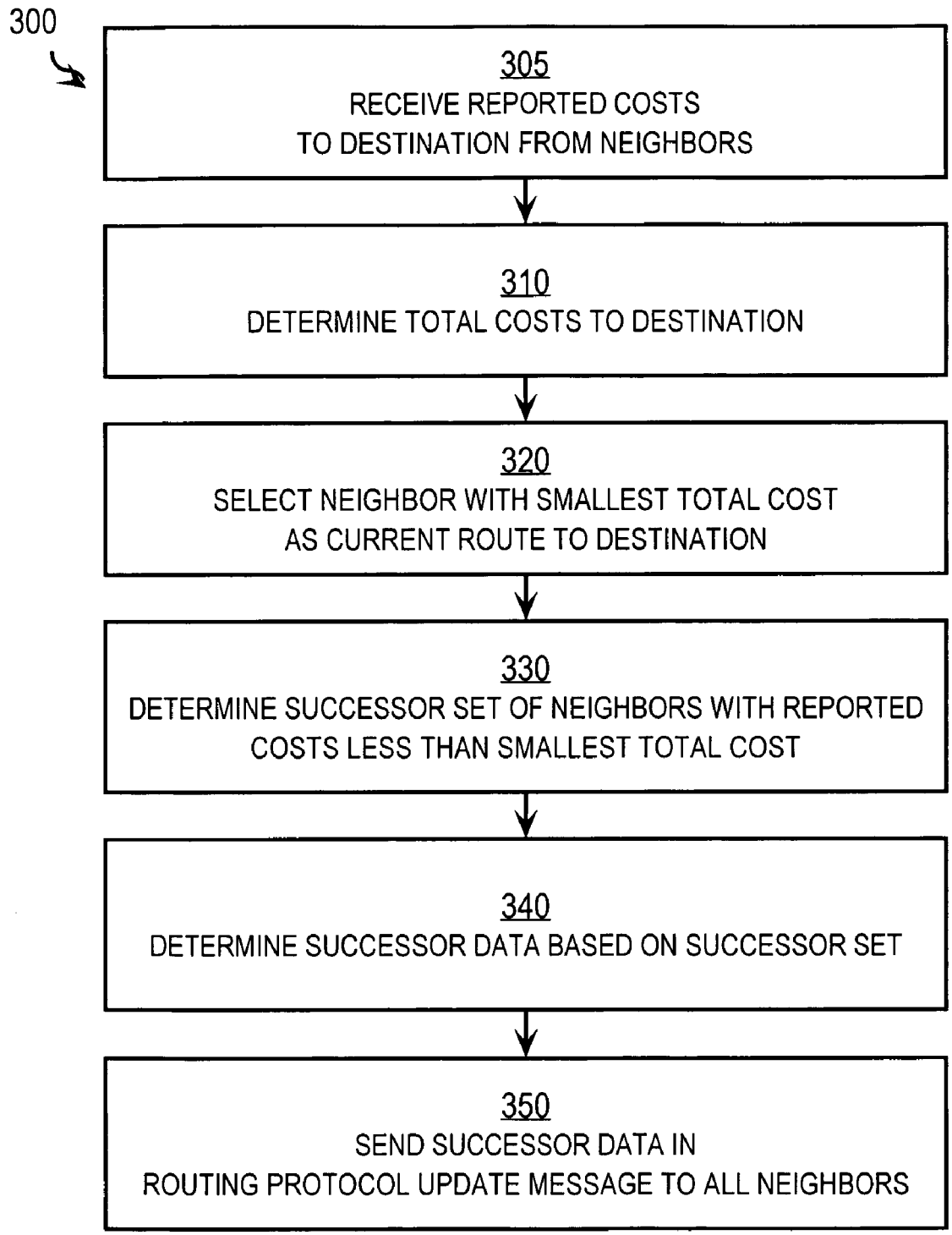

TECHNIQUES FOR DECREASING QUERIES TO DISCOVER ROUTES IN AN INTERIOR GATEWAY PROTOCOL

BACKGROUND OF THE INVENTION

1. Field of the Invention

The present invention relates to building routing tables at intermediate network nodes for routes within an autonomous system; and in particular to reducing the number of queries to discover alternative routes to a particular node.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. The header includes information such as the source of the packet, its destination, the length of the payload, and other properties used by the protocol. Often, the data in the payload for the particular protocol includes a header and payload for a different protocol associated with a different layer of detail for information exchange.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are network devices that determine which communication link or links to employ to support the progress of data packets through the network. A network node that determines which links to employ based on information in the internetwork header (layer 3) is called a router.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A routing protocol only exchanges control plane messages used for routing data packets sent in a different routed protocol (e.g., IP). A portion of a network under the network administration of a single authority, such as an enterprise or Internet service provider (ISP) is called a domain or an autonomous system (AS). To reduce the consumption of network resources and improve scalability, some routing protocols send only summarized routing information. Routing information for an AS is summarized at its boundaries with one or more other ASs at intermediate network nodes called border gateway nodes or border gateway (BG) routers. Routing information shared within the borders of one AS is exchanged using an interior gateway protocol (IGP). Example IGPs include the link state protocols such as the intermediate system to intermediate system (IS-IS) protocol and the open shortest path first (OSPF) protocol. Another IGP, developed by Cisco Systems of San Jose, Calif. for use in its routers, is the Enhanced Interior Gateway Routing Protocol (EIGRP). Some of the link-state protocols divide an autonomous system into multiple areas, flood all data for a unified routing database within and area, but send only summarized information between areas. Some IGPs, like EIGRP, send only summary information from each intermediate node in the autonomous system.

To determine the best route in IGPs that send only summary routing information, the summary routing information includes for each destination node, a measure of the cost (called a cost metric) to reach that destination node from the intermediate node (e.g., router) providing the summary information. Metrics of cost to traverse links in a network are well known in the art. A router receives such summary routing information from each neighboring router (neighbor) with which the router shares a direct communications link. The receiving router then determines the route (i.e., the best next hop, also called the best "path" herein) based on the cost metrics reported by all the neighbors and the costs to traverse the link to reach each of those neighbors.

In a current approach, when a router loses a route to a particular destination, and does not have a record in storage for an alternative path that is loop-free, the router sends a query to each neighbor, asking for the neighbor's routes and costs to the particular destination. A loop-free path from a particular router is one in which the next hop goes to a router that is not farther from the destination than the particular router itself. If the next hop goes to a farther router, subsequent hops are likely to come back to the particular router, thus forming a loop.

While suitable for many purposes, there is a disadvantage with this approach. If even one of the queried neighbors does not have a loop-free path, that neighbor queries all its other neighbors. The query can thus propagate throughout the autonomous system, or until no information is available at any intermediate node for the destination address that is the object of the original query. The number of hops the queries make is the scope of the query. Querying routers wait for all queried routers to respond before selecting a new route from among the reported paths. The larger the scope of the query, the longer the convergence time until the new route, if any, is selected. For autonomous systems with thousands of nodes, the query scope can easily reach dozens of hops and convergence times can easily exceed several seconds. A lost route for several seconds can lead to thousands of lost transactions, which can lead to losses of millions of dollars in some financial systems.

Based on the foregoing, there is a clear need for techniques to limit the scope of queries initiated when a router loses a route to a particular destination. In particular, there is a need to avoid querying at least some neighbors that do not have a loop-free path to a destination that is a subject of the query.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a flow diagram that illustrate at a high level a method for generating routing protocol messages for reducing query scope, according to an embodiment;

DETAILED DESCRIPTION

Techniques are described for determining a route in a packet-switched communications network with reduced query scope. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, embodiments of the invention are described in the context of EIGRP for an autonomous system. However, the invention is not limited to this context and protocol, but may be applied in any routing protocol that sends summary information including destination addresses and cost metrics in update messages.

1.0 Network Overview

Figure 1:
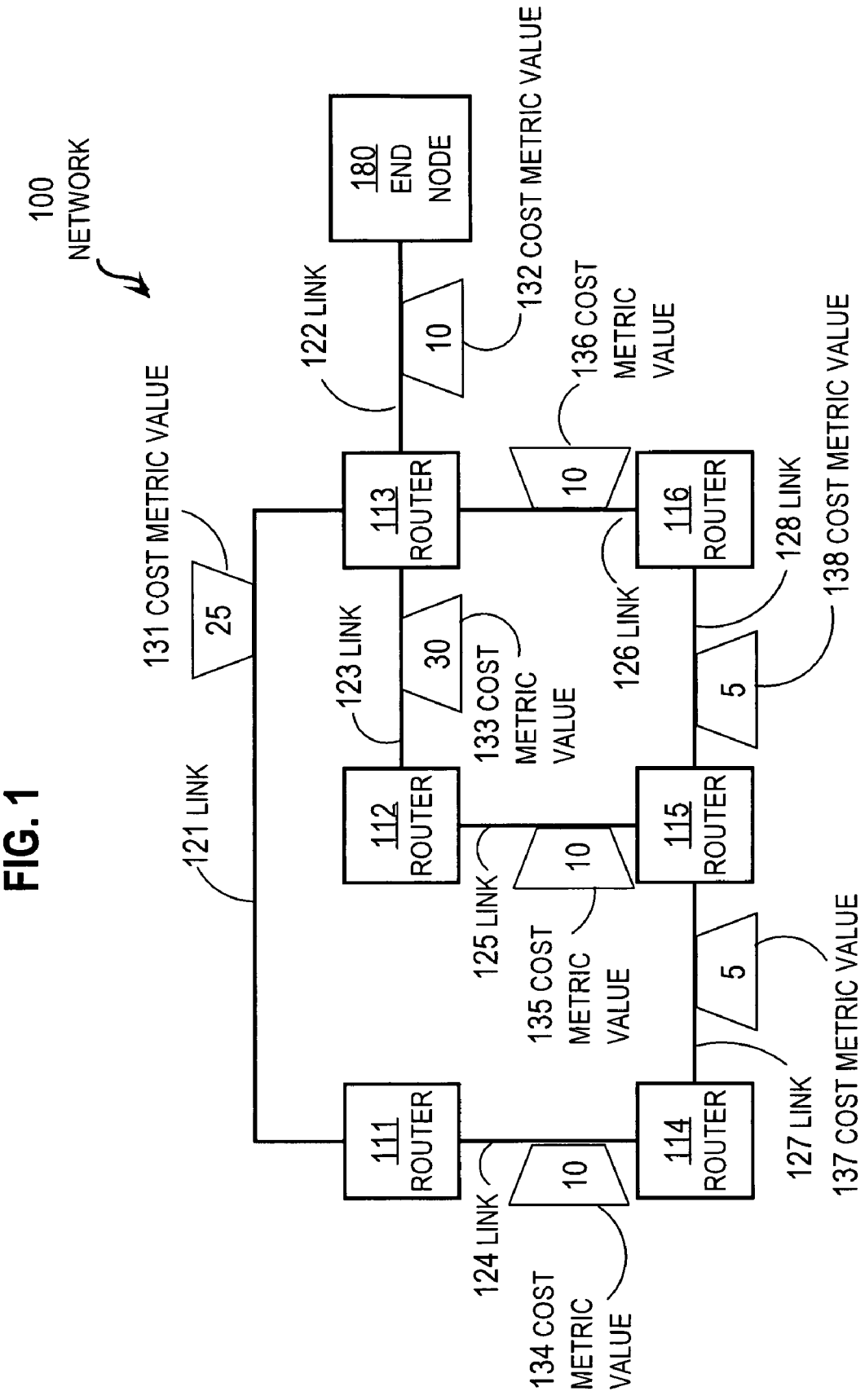
FIG. 1 is a block diagram that illustrates a network that includes multiple routers, according to an embodiment.

FIG. 1 is a block diagram that illustrates a network 100 that includes multiple routers, according to an embodiment. Network 100 includes six intermediate network nodes: router 111, router 112, router 113, router 114, router 115, and router 116, collectively referenced hereinafter as routers 110. Network 100 also includes end node 180. The routers 110 and end node 180 are connected by eight communication links: link 121, link 122, link 123, link 124, link 125, link 126, link 127, and link 128, collectively referenced hereinafter as links 120. Also shown in FIG. 1 is a cost metric value associated with each link. A cost metric value represent a property of a link and is not a separate physical component of network 100. Eight cost metric values are shown: cost metric value 131, cost metric value 132, cost metric value 133, cost metric value 134, cost metric value 135, cost metric value 136, cost metric value 137, and cost metric value 138 (collectively referenced hereinafter as costs 130) associated with link 121, link 122, link 123, link 124, link 125, link 126, link 127 and link 128, respectively.

While a certain number of nodes 110 and links 120 and end nodes 180 are depicted in network 100 for purposes of illustration, in other embodiments, a network includes more nodes, such as routers, more links, with the same or different costs 130, and more end nodes.

Any method known in the art may be used to determine a cost metric value for a link. For example, in some embodiments a cost on a link is given approximately by Equation 1, which is an approximation of a more comprehensive cost metric that includes seven terms.

$$\text{Cost metric} = \text{bandwidth} \ast 10^{-7} + (\text{sum of link travel time delays}) \ast 256 \quad (1)$$

Using the data depicted in FIG. 1, Table 1 lists the cost of using the best links and neighbors to reach the end node 190 from each router 110. Cost is given in arbitrary units.

TABLE 1

Example costs for the lowest cost path from routers 110 to end node 180 as depicted in FIG. 1

| Local router | Neighbor router | # hops | Cost |
| --- | --- | --- | --- |
| 113 | — | 1 | 10 |
| 116 | 113 | 2 | 20 |
| 115 | 116 | 3 | 25 |
| 112 | 115 | 4 | 35 |
| 114 | 115 | 4 | 30 |
| 111 | 113 | 2 | 35 |

Routes of Table 1 are constructed based on control plane messages for a metric-based IGP, such as EIGRP. For example, router 113 determines a cost of 10 to reach end node 180 and advertises this in control plane messages to each of its neighbors: router 111, router 112, and router 116 on link 121, link 123, and link 126, respectively. Those control plane messages each includes the network address of end node 180, and the reported cost 10 of reaching end node 180 as reported by the advertising router 113. For purposes of illustration, it is assumed that the network address of end node 180 is 1.1.1.180. At receiving routers, each router adds the cost of traversing the link between itself and router 113 to determine the cost of using that link. Thus router 111 adds link cost 25 of link 121 for a total cost of 35; router 112 adds link cost 30 of link 123 for a total cost of 40; and router 116 adds link cost 10 of link 126 for a total cost of 20. The process continues until the cost of reaching end node 180 is known by all routers for all neighbors. Based on the cost of link 125, link 128 and link 126 from router 112 to router 113 indirectly through router 115 and router 116 summing to less than 30, the best path from router 112 to end node 180 goes through router 115 rather than router 113, as shown in Table 1.

FIG. 1 and Table 1 are used in the following to illustrate a reduced scope of queries when a route is lost, according to an illustrated embodiment.

According to embodiments of the invention, the control plane messages sent by a router to its neighbors are changed to include sending, to every neighbor, successor data that is described in more detail below. The successor data indicates the existence of one or more loop free alternative paths to the destination from the advertising router that sends the control plane message in addition to any route from the advertising router with the reported cost metric of that route at the advertising router. The successor data is used to determine particular neighbors to query when a particular route is lost, as described in more detail below.

2.0 Data Structures for Routing Information

Figure 2A:
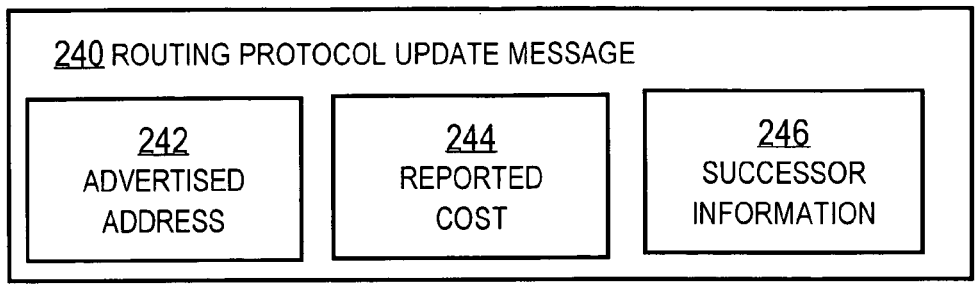
FIG. 2A is a block diagram that illustrates a control plane message for a routing protocol that allows a query of reduced scope, according to an embodiment.

FIG. 2A is a block diagram that illustrates a control plane message 240 for a routing protocol that allows a query of reduced scope, according to an embodiment. Control plane message includes an advertised address field 242, a reported cost field 244, and a successor information field 246. The successor information 246 is not sent among routers in previous approaches. The generation and consumption of successor information 246 is described in more detail with respect to FIG. 3, FIG. 4A and FIG. 4B. In some embodiments, the reported cost field 244 is omitted or contains a value that indicates no route is being advertised to the receiving router.

Figure 2B:
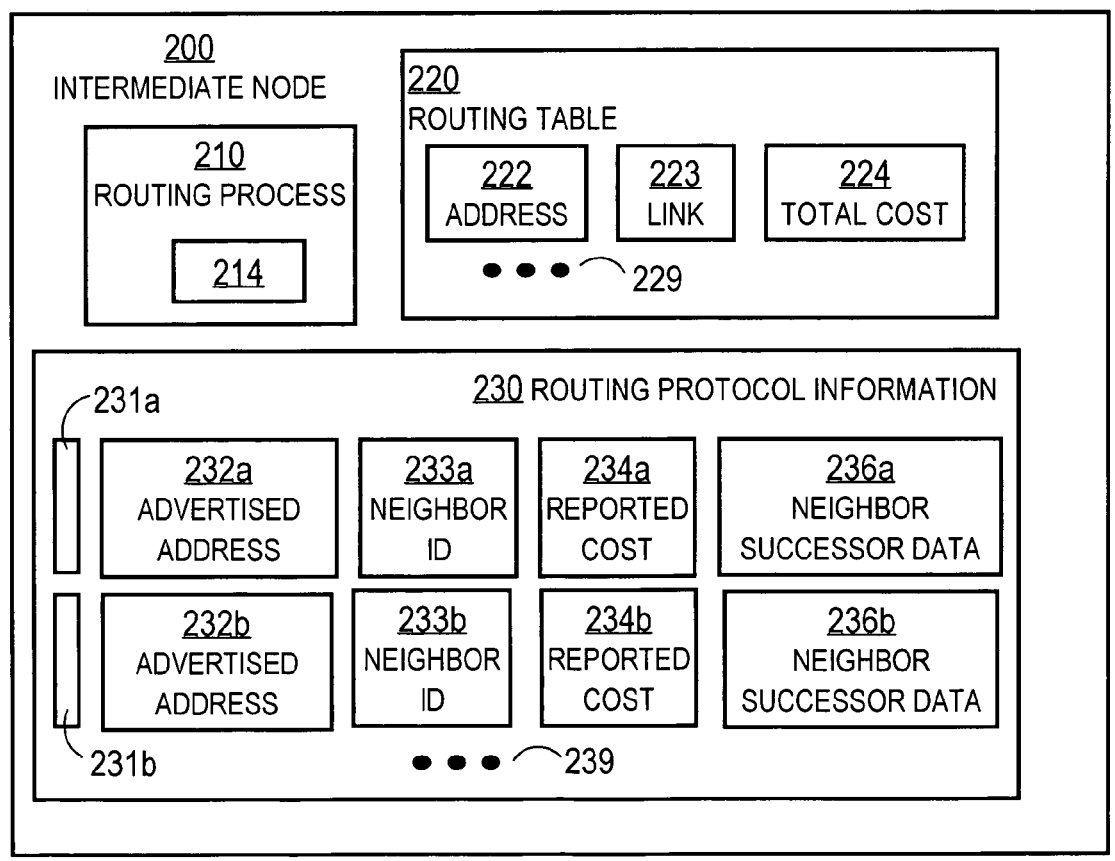
FIG. 2B is a block diagram that illustrates a router that uses the control plane message depicted in FIG. 2A according to an embodiment.

FIG. 2B is a block diagram that illustrates a router 200 that uses the control plane message 240 depicted in FIG. 2A according to an embodiment. Router 200 includes a routing process 210, a routing table 220, and routing protocol information 230.

The routing process 210 executes on a processor, such as a general purpose processor executing sequences of instructions that cause the processor to perform the routing process. According to embodiments of the invention, routing process includes process 214 to process successor information as described in more detail below with respect to FIG. 3, FIG. 4A and FIG. 4B. The routing process 210 stores and retrieves information in the routing table 220 based on information received in one or more routing protocol update messages that are stored in a routing protocol information data structure 230.

The routing table 220 is a data structure that includes for each destination that can be reached from the router 200, an address field 222, a link field 223 and zero or more attribute fields. In the illustrated embodiment, the attributes fields include a total cost field 224. Fields for other destinations in routing table 220 are indicated by ellipsis 229.

The routing protocol information data structure 230 is a data structure that includes for each destination received in a routing protocol update message an address field (e.g., address fields 232a, 232b, collectively referenced hereinafter as address fields 232); a neighbor identifier (ID) field (e.g., neighbor ID fields 233a, 233b, collectively referenced hereinafter as neighbor ID fields 233); a reported cost field (e.g., reported cost fields 234a, 234b, collectively referenced hereinafter as reported cost fields 234); and a neighbor successor data field (e.g., neighbor successor data fields 236a, 236b, collectively referenced hereinafter as neighbor successor data fields 236). In the illustrated embodiment, data structure 230 also includes local successor flag fields 231a, 231b (collectively referenced hereinafter as local successor flag fields 236). Fields for other destinations in routing protocol information data structure 230 are indicated by ellipsis 239.

Data structures may be formed in any method known in the art, including using portions of volatile memory, or non-volatile storage on one or more nodes, in one or more files or in one or more databases accessed through a database server, or some combination. Although data structures 220, 230 are shown as integral blocks with contiguous fields, e.g. fields 232, for purposes of illustration, in other embodiments one or more portions of fields and data structures 220, 230 are stored as separate data structures on the same or different multiple nodes that perform the functions of router 200.

The advertised address field holds data that indicates a network address, such as the IP address, of a particular end node (e.g., end node 180) of the network (e.g., network 100). The neighbor ID field 233 holds data that indicates the neighbor from which (or the link over which) information about the associated advertised address was received. The reported cost field 234 holds data that indicates the cost to reach the associated advertised address indicated by the neighbor. If the neighbor did not advertise a route to the associated advertised address, the reported cost field 234 hold a default or null value, such as the maximum cost value available for the cost metric. Fields 232, 233, 234 are included in data structure 230 in conventional IGPs, such as EIGRP.

According to various embodiments of the invention, routing protocol information data structure includes neighbor successor field 236 or local successor flag field 231 or both. Local successor flag field 231 indicates whether the associated neighbor or link indicated in neighbor ID field 233 includes a loop-free path from the local router 200 to the associated advertised address in field 232. As described in more detail below, this can be determined from the current total cost of reaching the address in the routing table 220 and the reported cost in field 234 of the neighbor indicated in field 233. If the reported cost is less than the current total cost, then the path through that neighbor is a loop free path from the local router 200. Neighbor successor data field 236 indicates whether the associated neighbor or link indicated in neighbor ID field 233 includes a loop-free path from that neighbor to the associated advertised address, rather than from the local router 200 to the associated address.

3.0 Method for Reducing Query Scope

FIG. 3 is a flow diagram that illustrates at a high level a method 300 for generating routing protocol messages for reducing query scope, according to an embodiment. Although steps in FIG. 1 and subsequent flow diagrams are shown in a particular order for purposes of illustration, in other embodiments one or more steps may be performed in a different order or overlapping in time, or one or more steps may be omitted or added, or some combination of changes may be made.

In step 305, messages are received from neighboring routers with which a local router is directly connected. As shown in message 240 of FIG. 2A, the messages indicate reported costs (field 244) from those neighboring routers (determined based on the physical link through which the message is received) to one or more destination network addresses (e.g., IP addresses, such as in field 242). A sequence for messages cascading from router 113 is described above with reference to building Table 1. In an illustrated embodiment, this information is stored in fields 232, 233, 234 of routing protocol information data structure 230 on the local router. Contents for the neighbor ID field 233 are determined in any way known in the art, such as by source address field (not shown) in a header of message 240, or an identifier for the physical link on which the message 240 is received at the local router. In at least some embodiments, successor information in field 246 of the message 240 is also received during step 305 and stored in field 236; however, the meaning and use of the successor information is described in more detail with reference to other steps in method 300. For example, router 112 receives as reported costs to reach end node 180, reported cost of 10 from router 113 and reported cost of 25 from router 115. In some embodiments, e.g., in EIGRP, neighbors only report their lowest cost path (i.e., their route) to a destination as described below, and not all paths.

In step 310, the local router determines the total costs to a particular destination via the various neighbors that report routes to that destination. A total cost is determined by adding to the reported cost from a particular neighbor a value that indicates a link cost to traverse the link between the local router and that particular neighbor. Any manner known for determining the link costs between a local router and its neighboring routers (neighbors) may be used. See, for example, A. Retana, R. White and D. Slice, EIGRP for IP: Basic Operation and Configuration, ISBN 0201657732, Addison-Wesley, Boston (2000). In router 112 of the illustrated embodiment, the local router determines a total cost to end node 180 is 40 through its link 123 with router 113, and is 35 through its link 125 with router 115. Table 2 compares the reported and total costs to reach end node 180 through various links at router 112 in the illustrated embodiment.

TABLE 2

Costs to reach end node 180 considered at router 112.

| Link | Neighbor | Link cost | Neighbor reported cost to reach end node 180 | Total cost |
|------|----------|-----------|----------------------------------------------|------------|
| 123  | 113      | 30        | 10                                           | 40         |
| 125  | 115      | 10        | 25                                           | 35         |

In step 320, a neighbor associated with the smallest total cost is selected as the next hop for the current route to the destination. For example, at router 112 in the illustrated embodiment, router 112 selects link 125 through neighbor 115 as the next hop for the current route to end node 180. The lowest total cost to a destination is here called the total metric to the destination; thus the total metric to end node 180 from router 112 is 35. (In some implementations, the lowest total cost to a destination is called the "feasible distance" to the destination.) The existence of a route to the destination, along with the total metric to the destination, is normally advertised to the local router's neighbors in the routing protocol (control plane) messages.

In some embodiments that use a split-horizon rule, the destination and total metric are not reported to the router that has been selected as the next hop on the route. That neighboring router already knows the very route being advertised and if that neighboring router were to use the local router, a loop would result. For example, without the split-horizon rule, a data plane message sent by router 115 to router 112 would then be sent by router 112 back to router 115, creating the loop. The split-horizon rule thus limits the propagation of looping routes. Based on the split horizon rule, a conventional router 112 would advertise a route for end node 180 with reported cost 35 to neighbor 113, but not advertise this route to neighbor 115.

According to the illustrated embodiments, a route advertisement routing protocol message is not sent with only the destination and reported cost but also with successor data, if any. In some embodiments, the split horizon rule is replaced by a poison reverse rule to both propagate successor information and to prevent loops. According to the poison reverse rule, a local node advertises routes to a neighbor through which the local node is currently routing traffic, but with a maximum value (essentially, an "infinite" metric) for the reported cost. The neighbor will not use the local node as a path to reach the destination because of the "infinite" cost to use the local node from that neighbor.

In step 330, a local feasible successor set of zero or more alternative loop-free paths are determined. The feasible successor set excludes the route selected in step 320. It is a characteristic of the EIGRP cost metric, and many other metrics that are used in other embodiments, that a neighbor that has a reported cost less than the total metric of the local router necessarily has a loop-free path from the local router to the destination. Consider that, if the neighbor's path looped back through the local router, then the neighbor's reported cost must include the cost of the local router and could not be smaller than the total metric of the local router. For example, router 112 has a total metric of 35 to reach end node 180 through neighboring router 115, as determined in step 320. The reported cost by the other neighbor, router 113 is 10. Because 10 is less than 35, the path through router 113 is loop free, cannot pass back through router 112; and the path through router 113 is included in the feasible successor set of loop-free paths at router 112.

In step 340, successor data to be reported to neighbors is determined based on the feasible successor set. In some embodiments, successor data includes data that indicates that the feasible successor set for the local router has at least one member. In some embodiments, the successor data includes data that indicates a total cost or a reported cost for one or more members of the feasible successor set if there are more than zero members in the feasible successor set. In some embodiments, successor data indicates the existence of at least one feasible successor at the local router. For router 112 in the illustrated embodiment, the successor data has a value "1."

In the illustrated embodiments, the successor data reported to a neighbor depends on the neighbor, so that a particular neighbor that is the next hop for a particular feasible successor is sent successor data that does not indicate that particular feasible successor. For router 112 in the illustrated embodiment, which has a route through router 115 and a feasible successor through router 113, the successor data sent to router 115 indicates a feasible successor with a value "1"; but the successor data sent to router 113 does not indicate any feasible successor, with a value "0." In some embodiments, the successor data is not dependent on the neighbor to which the successor data is sent; e.g., in some embodiments the successor data is a list of router IDs for the feasible successors. The successor data is sufficient for a receiving node to determine whether the feasible successor advertised goes through the receiving node.

Following the method 300 through step 340 for the example six routers and one end node destination depicted in FIG. 1, the route, successor set members, and successor information listed in Table 3 are determined.

TABLE 3

Feasible successor set members and successor data to reach end node 180.

| Local router | Route next hop | Total metric | Feasible successor routers (with reported distance) | Successor data sent to (neighbor) |
|--------------|----------------|--------------|------------------------------------------------------|-----------------------------------|
| 111          | 113            | 35           | 114 (30)                                             | 1 (113); 0 (114)                  |
| 112          | 115            | 35           | 113 (10)                                             | 0 (113); 1 (115)                  |
| 113          | 180            | 10           | —                                                    | 0 (111, 112, 116)                 |
| 114          | 115            | 30           | —                                                    | 0 (111, 115)                      |
| 115          | 116            | 25           | —                                                    | 0 (112, 114, 116)                 |
| 116          | 113            | 20           | —                                                    | 0 (115, 114)                      |

Router 113 has no feasible successors. Each neighboring router, 111, 112, 116 would cause a loop back through router 113. Router 114 also has no feasible successors. The alternative path through router 111 has a reported cost of 35 which is greater than the total metric of 30 for router 114. Router 115 has no feasible successor; both of its remaining neighbors (routers 112, 114) have reported costs (40 and 45, respectively) that are greater than its total metric of 25. Similarly, router 116 has no feasible successors; its remaining neighbor 115 has a reported cost of 25 which is greater than its total metric of 20.

In some embodiments, the routing protocol information data structure 230 includes for each entry a flag field 231 to identify which neighbors constitute a member of the feasible successor set at the local router. For example, at router 112, a flag field (e.g., flag field 231*a*) associated with neighboring router 113 is set to a first value (e.g., "2") to indicate it is a feasible successor. In some embodiments, described in more detail below, the flag field 231 contains a different value (e.g., "1") if the associated neighbor has reported a feasible successor as indicated by data in the neighbor successor data field 236. In some embodiments a flag field (e.g., flag field 231*b*) associated with another neighbor (e.g., router 115) is set to a third value (e.g., "0") to indicate that neighbor is neither a member of the feasible successor set nor reports a feasible successor of its own. In some embodiments, a fourth value (e.g. "3") indicates the neighbor is the selected next hop for the route. In some embodiments, the members of the feasible successor set are determined from the other data in the routing protocol information data structure 230 as needed, and the flag field is not included. The flag field is described in the illustrated embodiment so the human reader does not have to re-compute the feasible successors and reported feasible successors as that information is used in following steps.

In step 350, the successor data is sent to at least one neighboring router in a routing protocol control plane message. For example, in a route advertisement message like message 240 sent from router 112 to router 113 with the address of end node 180 in field 242 and reported cost 35, the successor value "0" is included in successor information 246. The zero value in the successor information field indicates no alternative loop free path is available through the advertising router (router 112) that sends the message. This is because the feasible successor at router 112 is router 113 and such a path is not available to router 113. Thus, a zero is sent to router 113 (see Table 3 for local router 112). For example, the values in the flag fields 231 associated with a particular destination are compared so that a value of 1 is produced if any neighbor has a value "2" indicating it is a feasible successor and the receiving node is different from the advertising node indicated in field 223.

In the illustrated embodiment, the successor data is sent to all neighboring routers, even those that would not be sent a route advertisement message by the split horizon rule. In an example of the illustrated embodiment, successor data is sent to router 115. Because a route advertising message is not sent to router 115 by the split horizon rule, a different type of routing protocol control plane message is sent to router 115, according to one embodiment. For example, during step 350, a message like message 240, but without field 244, is sent to neighboring router 115 from router 112. This message includes the address of end node 180 in field 242 and the successor value "1" in field 246 (see Table 3 for local router 112 and receiving router 115).

In some embodiments, the message includes field 242 but includes the total metric for the local sending node, e.g., the value 35 for the current best route. In some embodiments, the message includes field 242 but includes a default value, e.g., zero or null or a maximum allowable metric value, to indicate the route from the sending node is not loop-free. In some embodiments, using the poison reverse rule, the message includes field 242 but includes a maximum allowable metric value, an "infinite" value, to indicate the route from the sending node is not loop-free.

Following step 350, router 115 receives a routing protocol control message, e.g., an update message, which indicates router 112 has at least one feasible successor to end node 180. Similarly, router 113 receives a routing protocol control message, e.g., an update message, which indicates router 111 has at least one feasible successor to end node 180. However, router 113 receives a routing protocol control message, e.g., an update message, which indicates router 112 does not have at least one feasible successor to end node 180. Similarly, router 114 receives a routing protocol control message, e.g., an update message, which indicates router 111 does not have at least one feasible successor to end node 180.

Figure 4A:
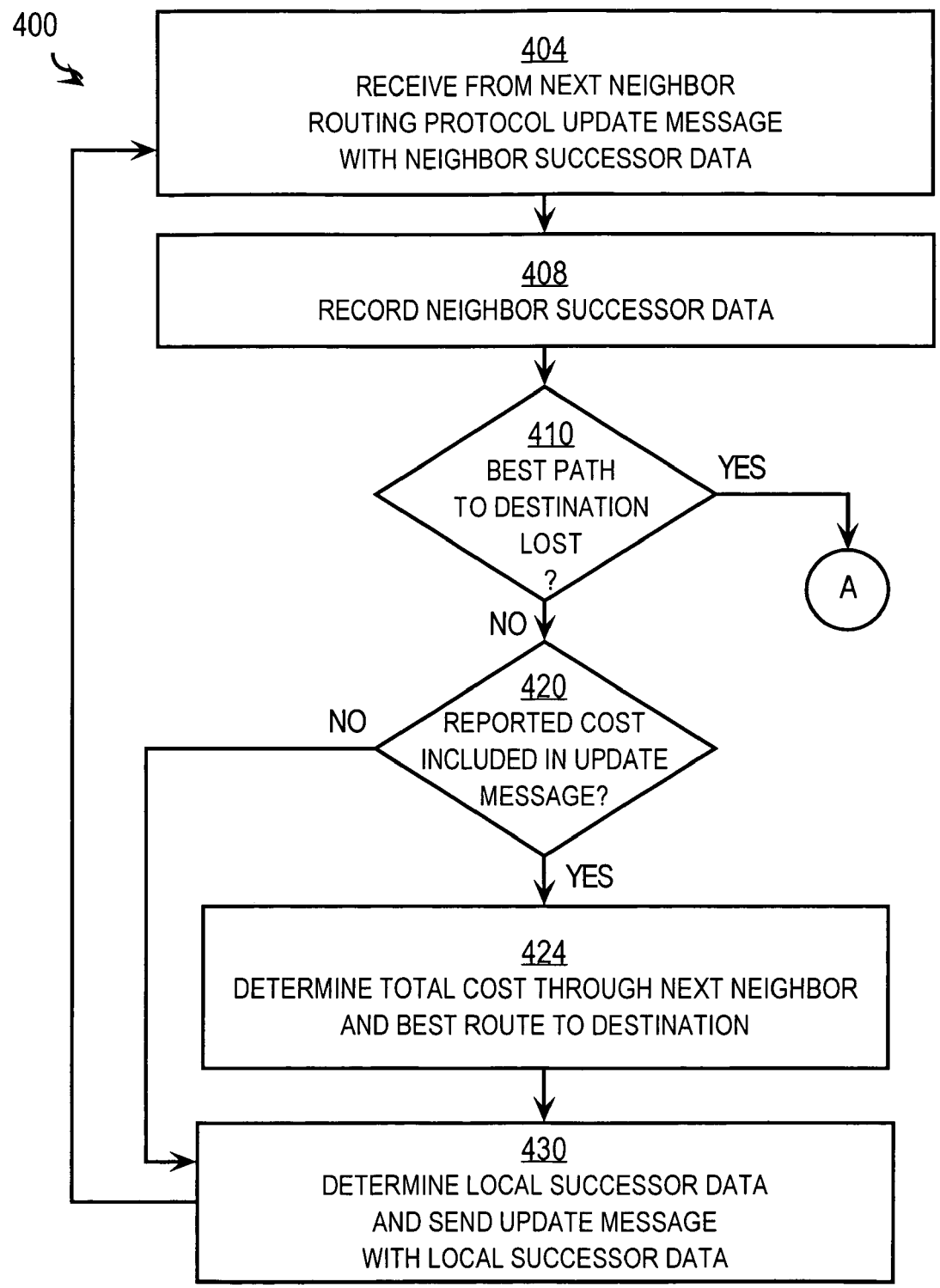
FIG. 4A and FIG. 4B constitute a flow diagram that illustrate at a high level a method for processing received routing protocol messages to reduce scope of a query, according to another embodiment.
Figure 4B:
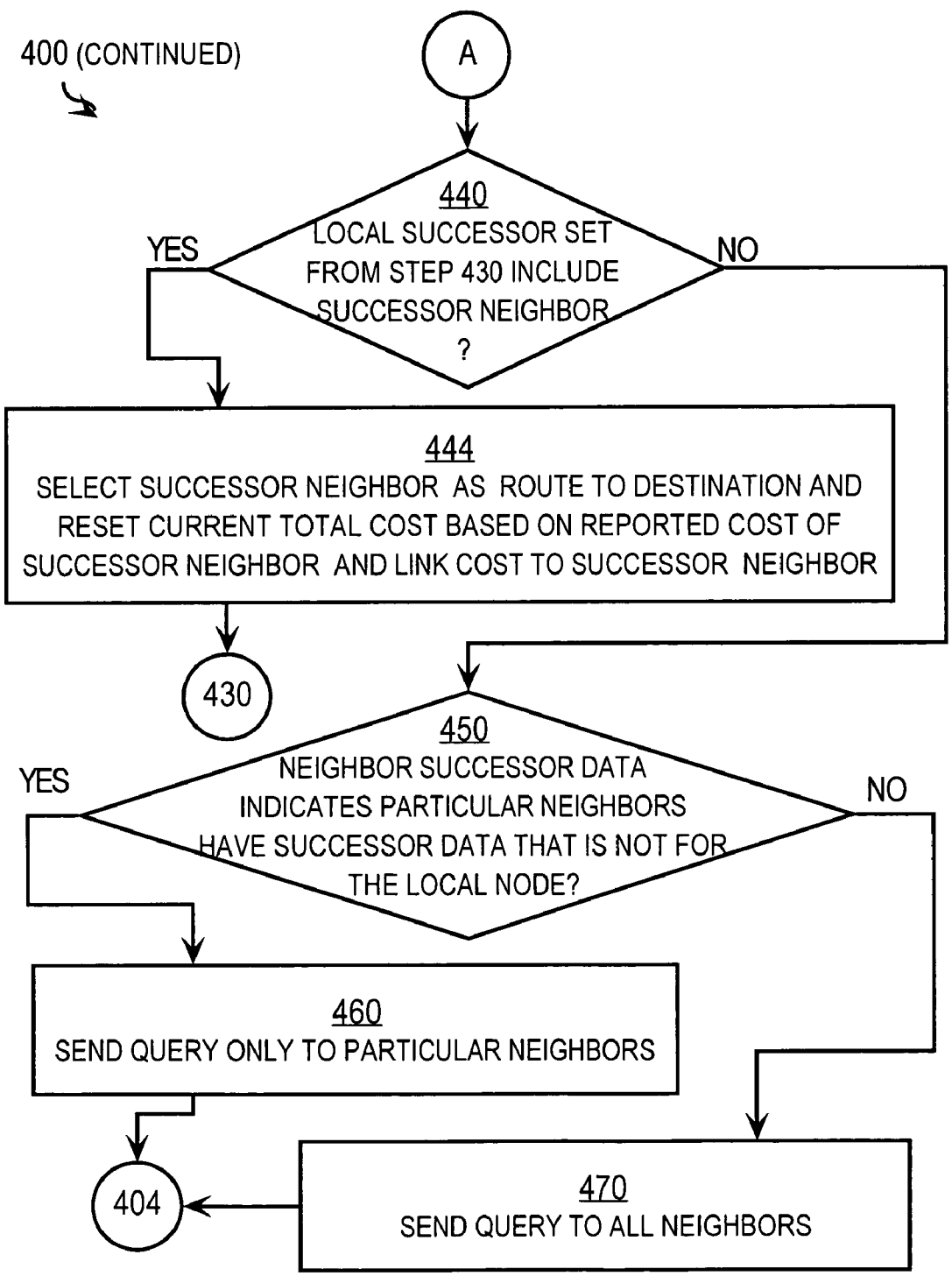

According to some embodiments of the invention, the successor data, e.g., the successor information in field 246, is used to determine which neighbors to query when a route is lost, as described in more detail with reference to FIG. 4A and FIG. 4B. FIG. 4A and FIG. 4B constitute a flow diagram that illustrate at a high level a method 400 for processing received routing protocol messages to reduce scope of a query, according to another embodiment. Method 400 is another embodiment of method 300, with detail added for using the successor data supplied by one or more neighboring routers, e.g., in field 246. The information is used to send queries to only those neighbors that advertise feasible successors, if any, and thus to bound query scope to fewer hops. In many circumstances, the query scope is bounded in one hop to those neighbors for which the querying router knows the queried neighbor will respond about a particular end node address.

In step 404 a routing protocol update message is received at a local router, which includes successor data from a neighbor, such as a message sent in step 350 by neighboring routers of the local router. Note that a local router includes data to determine a successor set for the local router, and the successor information received during step 404 is successor information that applies to the neighbor that sends the update message.

In step 408, information based on the neighbor successor data is stored on the local router. For example, the successor information is stored in field 236 in association with a particular destination address in field 232 and a neighbor ID, such as a link identifier, in field 233. For purposes of illustration, Table 4 lists contents of the routing protocol information data structure 230 on router 115 based on the information in table 3 sent to neighboring routers during step 350 and received at router 115 during step 404. Recall that, for purposes of illustration, it is assumed that the network address for end node 180 is 10.1.1.180. As described above, the total metric from router 115 to end node 180 is 25.

TABLE 4

Example routing protocol information on router 115 for destination 180.

| Local successor flag | Advertised address | Neighbor ID (link ID) | Reported cost | Successor information |
|---|---|---|---|---|
| 1 | 10.1.1.180 | 112 (125) | "infinite" | 1 |
| 0 | 10.1.1.180 | 114 (127) | "infinite" | 0 |
| 3 | 10.1.1.180 | 116 (128) | 20 | 0 |
| 2 | 10.1.1.180 | 113 (—) | 10 | 0 |

As indicated in Table 4, the three neighbors of router 115 have reported their best route and successor information for end node 180 to router 115 in various routing protocol update messages. Router 112 over link 125 has reported no route (because its best route to end node 180 is through router 115)

but a feasible successors (see Table 3 for router 112). The lack of a route is indicated by the "infinite" reported cost. Router 114 over link 127 has reported no route (because its best route to end node 180 is through router 115) and no feasible successor. Router 116 over link 128 has reported one route with a reported cost of 20 and no feasible successor.

For purposes of illustration it is further assumed that in some embodiments, there is a link (not shown in FIG. 1) between router 115 and router 113 with a link cost of 20. In such embodiments, router 113 reports to router 115 a route with a reported cost of 10 and no feasible successor.

The contents of the local successor flag in the first column of table 4 are described with reference to step 430, below.

In step 410, it is determined whether the route (i.e., the best path, i.e., the path with the lowest total cost) to a particular destination is lost. Any manner known in the art may be used to determine whether the best route is lost. For example, in the illustrated embodiment, the route is through link 128 with router 116, as indicated by the value "3" in the successor flag. If keep alive messages are not received in a timely way on this link, or some lower layer process indicates the link has failed, it is assumed the link is gone. Therefore the best route is lost. In some embodiments, a neighbor that formerly reported a cost that led to the lowest total cost now reports a higher cost that generates a higher total cost that can no longer be assumed the lowest total cost.

If it is determined in step 410 that the best path to a particular destination is lost, control passes to steps in FIG. 4B, represented by connection point A in FIG. 4A. FIG. 4B is described in more detail below.

If it is determined in step 410 that the best path to a particular destination is not lost, control passes to 420. In step 420, it is determined whether the routing protocol update message includes a non-"infinite" reported cost. For example, the routing update message for router 116 includes a reported cost of 20, but the update message from routers 112, 114 do not include a reported cost because of the split horizon rule, or report an "infinite" cost by the poison reverse rule.

If it is determined in step 420 that the routing protocol update message includes a reported cost, then control passes to step 424. In step 424 the total cost through the next neighbor is determined and used to determine whether there is a new route to the destination with a new total metric (a new lowest total cost). Step 424 is a particular embodiment of step 310 and step 320 from method 300. In the illustrated embodiment, it is determined in step 424 that the route to end node 180 from router 114 has a total metric of 25 through link 128 with router 116. This information is transferred to routing table 220 to replace any prior entry for the address of end node 180. Control then passes to step 430. If it is determined in step 420 that the routing protocol update message does not include a reported cost, then control passes to directly to step 430.

In step 430 the feasible successor set and successor data are determined and sent in an update message to all neighbors. Step 430 is a particular embodiment of step 330, step 340 and step 350 from method 300, described above. Control then passes to step 404 to await the next update message.

It is assumed for purposes of illustration, that local successor flag in field 231 of routing protocol information data structure 230 holds a three (3) if the associated neighbor is the next hop on a route and holds a two (2) if the associated neighbor is a feasible successor to the local router (i.e., has a reported distance less than the total metric). It is further assumed for purposes of illustration, that local successor flag in field 231 holds a one (1) if the associated neighbor advertises a successor of its own (i.e., the neighbor reports a feasible successor). It is further assumed for purposes of illustration, that local successor flag in field 231 holds a zero (0) if the associated neighbor neither is nor reports a feasible successor.

For example, in some embodiments with a link (not shown in FIG. 1) between router 115 and router 130 that has a reported cost of 10, less than the total metric value of 25 for router 115, then the successor flag in field 231 holds the value two (2) as shown in the last line of Table 4. In the illustrated embodiment, no neighboring router, other than the selected route, has a reported cost less than the total metric, thus there is no feasible successor router at router 115 in the illustrated embodiment. Routers 112, 114 do not advertise routes to router 115 because of the split horizon rule or poison reverse rule. Router 112 does advertise a feasible successor to end node 180; therefore the successor flag in field 231 holds the value one (1) as shown in the first line of Table 4. Router 112 is a possible successor for the local router 115. Router 114 does not advertise a feasible successor to end node 180; therefore the successor flag in field 231 holds the value zero (0) as shown in the first line of Table 4. Router 114 is neither a feasible successor nor a possible successor.

If it is determined in step 410 that the best path to a particular destination is lost, control passes to step 440 in FIG. 4B, represented by connection point A in FIG. 4A. For example, if the link 128 is broken between router 115 and router 116, then the route from router 115 to end node 180 with the total metric 25 is lost, and control passes to step 440.

In step 440, it is determined whether there are any feasible successors among the local router's neighbors as determined during step 430. For example, it is determined whether there are any entries in the routing protocols information data structure 230 with a value of 2 in the local successor flag 231 and the address of the end node for the lost route in the advertised address field 232.

If it is determined during step 440 that there are any feasible successors among the local router's neighbors, then control passes to step 444. During step 444 the feasible successor with the smallest total cost is selected as the route to the particular destination address. For, example, in embodiments that include a link (not shown) between router 115 and router 113, which has a value two (2) in the first column of Table 4, then control passes to step 444. In step 444, the smallest total cost is determined from among all the feasible successors (with a value of 2 in the local successor flag, field 231). Since only one neighbor has a value 2, then that neighbor is selected as the route. Thus, the link (not shown) to router 113 is the next hop for the new route after the link 128 is broken. This step is performed currently by EIGRP because a flag field 231 with a value of 2 is determined based on the reported cost in field 234 and is not based on the neighbor successor data field 236 used in the illustrated embodiments of the present invention. Control then passes to step 430 in FIG. 4A to update the local successor data and send any update messages to all neighbors.

If it is determined during step 440 that there are no feasible successors among the local router's neighbors, then control passes to step 450. For example, in the illustrated embodiments, there are no feasible successors (value 2 in local successor flag field 231) indicated in Table 4, because the last line of Table 4 is not included in the illustrated embodiment. Therefore control passes to step 450. In step 450, it is determined whether any neighbors have advertised a feasible successor that is not the local router. If so, control passes to step 460. If not, control passes to step 470. In the illustrated embodiment, only feasible successors that are not the local router are reported by the neighbors, therefore all feasible successors reported by neighbors exclude the local router.

If it is determined that no neighbor has advertised a feasible successor that is not the local router during step 450, then control passes to step 470. For example, it is determined whether any neighbor has a value of 1 in the local successor flag field 231. If not, control passes to step 470. In step 470 a query is sent to all neighbors asking for their best route to end node 180 at address 10.1.1.180. According to prior embodiments of EIGRP, such queries are always sent by a local router when there is no feasible successor at the local router; and no check is made for neighbors that reported a feasible successor, i.e., no check is made for possible successors. The queries to all neighbors causes a query scope that is rather large (and can approach the same scope of the network) and can take considerable time to converge, that is, considerable time to respond with revised reported routes. Therefore, it is an advantage of some embodiments to make such full scope queries only under some conditions in which there is no feasible successor for the local router and not under all conditions.

If it is determined that any neighbors have advertised a feasible successor that is not the local router during step 450, then control passes to step 460. For example, it is determined whether any neighbor has a value of 1 in the local successor flag field 231. In the illustrated embodiment, it is determined that neighbor 112 has a value of 1 and therefore has advertised a feasible successor (which is, therefore, a possible successor to router 115). In step 460 a query is sent only to the neighbors that are possible successors.

The possible successor is likely to respond with the original reported route or a route through its feasible successor. Thus the query is likely to be answered by the first router queried, and the query is not propagated to other levels unnecessarily. Therefore, the query scope is bounded to be less than the full scope of the network. In the illustrated embodiment, the query is directed only to the one neighbor with a 1 in the local successor flag, indicating a neighbor that has advertised a feasible successor—that neighbor is router 112 over link 125. Therefore a query is sent only to router 112 and a query is not sent to router 114. Router 112 has a feasible successor and therefore responds to the query without initiating more queries. On the other hand, router 114 does not have a feasible successor and therefore router 114, if queried, would also sends a query, thus increasing the scope of the query, compared to sending the query only to node 112 which has a feasible successor.

4.0 Implementation Mechanisms—Hardware Overview

Figure 5:
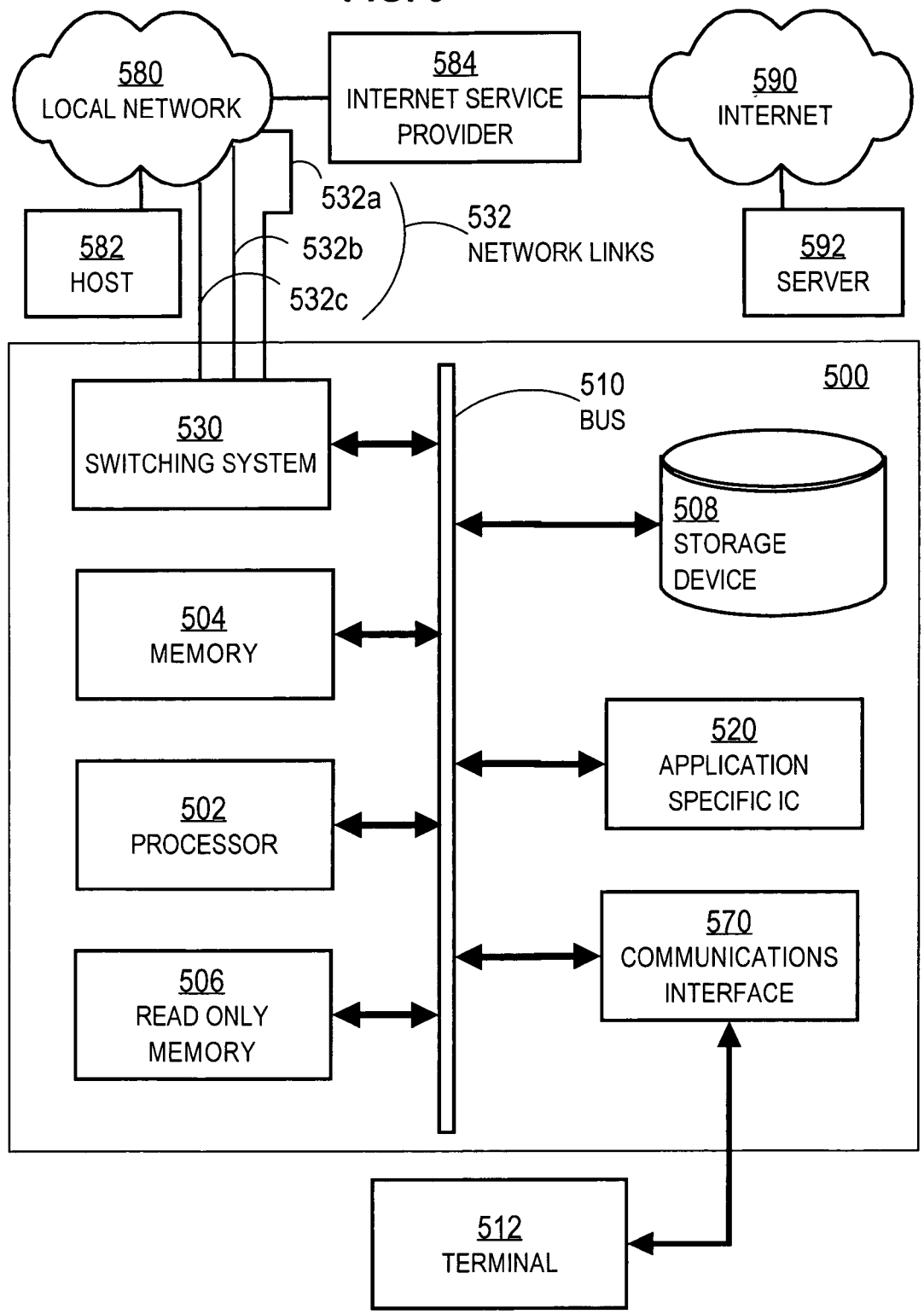
FIG. 5 is a block diagram that illustrates a router upon which an embodiment of the invention may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any non-transitory medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, and fiber optic cables.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
receiving, at an intermediate network node of a packet-switched communications network, a plurality of reported costs from a corresponding plurality of neighboring nodes that are linked to the intermediate network node, wherein a reported cost from a corresponding neighboring node is a measure of cost for transmitting data packets to a particular destination node in the network through the corresponding neighboring node;
determining a plurality of total costs for the corresponding plurality of neighboring nodes, wherein a total cost for a corresponding neighboring node is a sum of a measure of cost for transmitting data packets to the corresponding neighboring node plus a reported cost from the corresponding neighboring node, wherein a selected one of the plurality of the total costs is sent via control plane messages that include successor data indicative of a loop free alternative path to the particular destination node, and wherein the successor data includes information used to determine specific neighbors to query when a specific route in the network is lost;
determining a route to the particular destination by selecting a neighboring node of the plurality of neighboring nodes having a lowest total cost.

2. A method as recited in claim 1, further comprising sending the successor data to a first neighboring node of the plurality of neighboring nodes that indicates whether the successor set includes a neighboring node of the plurality of neighboring nodes different from the first neighboring node.

3. A method, comprising:
receiving, at an intermediate network node of a packet-switched communications network linked to a first plurality of neighboring nodes, successor data from a first neighboring node of the first plurality of neighboring nodes;
wherein
the first neighboring node is configured to receive a plurality of reported costs for reaching a particular destination node from a second plurality of neighboring nodes directly linked to the first neighboring node,
a reported cost from a corresponding neighboring node of the second plurality of neighboring nodes is a measure of cost for transmitting data packets to the particular destination node in the network through the corresponding neighboring node of the second plurality of neighboring nodes,
a total cost for a corresponding neighboring node of the second plurality of neighboring nodes is a sum of a measure of cost for transmitting data packets to the corresponding neighboring node from the first neighboring node and a reported cost from the corresponding neighboring node, and wherein the total cost for the corresponding neighboring node of the second plurality of neighboring nodes is sent via control plane messages that include successor data indicative of a loop free alternative path to the particular destination node, and wherein the successor data includes information used to determine specific neighbors to query when a specific route in the network is lost, wherein a selected neighboring node of the second plurality of neighboring nodes is associated with a lowest total cost.

4. A method as recited in claim 3, further comprising:
determining whether the successor data indicates more than zero nodes of the second plurality of neighboring nodes; and
if it is determined that the successor data indicates no more than zero nodes, then determining to not query the first neighboring node.

5. A method as recited in claim 4, further comprising receiving successor data from every neighboring node of the first plurality of neighboring nodes;
determining whether successor data indicates more than zero nodes for at least one neighboring node of the first plurality of neighboring nodes, and
if it is determined that the successor data indicates more than zero nodes for at least one neighboring node of the first plurality of neighboring nodes, then determining to not query the first neighboring node.

6. A method as recited in claim 3, further comprising:
determining whether the successor data indicates at least one node of the second plurality of neighboring nodes which is different from the intermediate network node; and
if it is determined that the successor data indicates at least one node which is different from the intermediate network node, then determining to query the first neighboring node.

7. An apparatus, comprising:
means for receiving a plurality of reported costs from a corresponding plurality of neighboring nodes that are linked to the apparatus, wherein a reported cost from a corresponding neighboring node is a measure of cost for transmitting data packets to a particular destination node in the network through the corresponding neighboring node;
means for determining a plurality of total costs for the corresponding plurality of neighboring nodes, wherein a total cost for a corresponding neighboring node is a sum of a measure of cost for transmitting data packets to the corresponding neighboring node and a reported cost from the corresponding neighboring node, wherein a selected one of the plurality of the total costs is sent via control plane messages that include successor data indicative of a loop free alternative path to the particular destination node, and wherein the successor data includes information used to determine specific neighbors to query when a specific route in the network is lost;
means for determining a route to the particular destination by selecting a selected neighboring node of the plurality of neighboring nodes, having a lowest total cost.

8. An apparatus, comprising:
means for receiving successor data from a first neighboring node of a first plurality of neighboring nodes linked to the apparatus wherein
the first neighboring node receives a plurality of reported costs for reaching particular destination node from a second plurality of neighboring nodes directly linked to the first neighboring node,
a reported cost from a corresponding neighboring node of the second plurality of neighboring nodes is a measure of cost for transmitting data packets to the particular destination node in the network through the corresponding neighboring node of the second plurality of neighboring nodes,
a total cost for a corresponding neighboring node of the second plurality of neighboring nodes is a sum of a measure of cost for transmitting data packets to the corresponding neighboring node from the first neighboring node and a reported cost from the corresponding neighboring node, and wherein the total cost for the corresponding neighboring node of the second plurality of neighboring nodes is sent via control plane messages that include successor data indicative of a loop free alternative path to the particular destination node, and wherein the successor data includes information used to determine specific neighbors to query when a specific route in the network is lost;
means for determining a selected neighboring node of the second plurality of neighboring nodes having a lowest total cost.

9. An apparatus, comprising:
a plurality of network interfaces coupled to a first network for communicating therewith a first data packet;
one or more processors;
a non-transitory computer-readable medium; and
one or more sequences of instructions stored in the computer-readable medium, which, when executed by the one or more processors, causes the one or more processors to carry out the steps of:
receiving a plurality of reported costs from a corresponding plurality of neighboring nodes that are linked to the plurality of network interfaces, wherein a reported cost from a corresponding neighboring node is a measure of cost for transmitting data packets to a particular destination node in the network through the corresponding neighboring node;
determining a plurality of total costs for the corresponding plurality of neighboring nodes, wherein a total cost for a corresponding neighboring node is a sum of a measure of cost for transmitting data packets to the corresponding neighboring node and a reported cost from the corresponding neighboring node, wherein a selected one of the plurality of the total costs is sent via control plane messages that include successor data indicative of a loop free alternative path to the particular destination node, and wherein the successor data includes information used to determine specific neighbors to query when a specific route in the network is lost;
determining a route to the particular destination by selecting a neighboring node of the plurality of neighboring nodes, having a lowest total cost.

10. An apparatus as recited in claim 9, wherein the successor data indicates whether a successor set of data includes a neighboring node of the plurality of neighboring nodes different from a first neighboring node.

11. An apparatus for determining a route in a packet-switched communications network, comprising:
a plurality of network interfaces coupled to a first network for communicating therewith a first data packet;
one or more processors;
a non-transitory computer-readable medium; and
one or more sequences of instructions stored in the computer-readable medium, which, when executed by the one or more processors, causes the one or more processors to carry out the steps of:
receiving successor data from a first neighboring node of a first plurality of neighboring nodes linked to the plurality of network interfaces, wherein
the first neighboring node receives a plurality of reported costs for reaching a particular destination node from a second plurality of neighboring nodes directly linked to the first neighboring node,
a reported cost from a corresponding neighboring node of the second plurality of neighboring nodes is a measure of cost for transmitting data packets to the particular destination node in the network through the corresponding neighboring node of the second plurality of neighboring nodes,
a total cost for a corresponding neighboring node of the second plurality of neighboring nodes is a sum of a measure of cost for transmitting data packets to the corresponding neighboring node from the first neighboring node and a report cost from the corresponding neighboring node, and wherein the total cost for the corresponding neighboring node of the second plurality of neighboring nodes is sent via control plane messages that include successor data indicative of a loop free alternative path to the particular destination node, and wherein the successor data includes information used to determine specific neighbors to query when a specific route in the network is lost; and
determining a selected neighboring node of the second plurality of neighboring nodes having a lowest total cost.

12. An apparatus as recited in claim 11,
wherein the processors are configured to:
determine whether the successor data indicates more than zero nodes of the second plurality of neighboring nodes; and
if it is determined that the successor data indicates no more than zero nodes, then the first neighboring node is not queried.

13. An apparatus as recited in claim 12, wherein the processors are configured to:
receive successor data from every neighboring node of the first plurality of neighboring nodes; and
determine whether successor data indicates more than zero nodes for at least one neighboring node of the first plurality of neighboring nodes, and
if it is determined that the successor data indicates more than zero nodes for at least one neighboring node of the first plurality of neighboring nodes, then the first neighboring node is not queried.

14. An apparatus as recited in claim 11, wherein the processors are configured to:
determine whether the successor data indicates at least one node of the second plurality of neighboring nodes which is different from the intermediate network node; and
if it is determined that the successor data indicates at least one node which is different from the intermediate network node, then the first neighboring node is not queried.

* * * * *